United States Patent
Nagano et al.

(10) Patent No.: US 9,963,589 B2
(45) Date of Patent: May 8, 2018

(54) EPOXY RESIN COMPOSITION, PREPREG, AND FIBER-REINFORCED COMPOSITE MATERIAL

(71) Applicant: TORAY Industries, Inc., Tokyo (JP)

(72) Inventors: Maki Nagano, Nagoya (JP); Ayako Fuse, Nagoya (JP); Nobuyuki Tomioka, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 196 days.

(21) Appl. No.: 14/897,393

(22) PCT Filed: Jul. 24, 2014

(86) PCT No.: PCT/JP2014/069550
§ 371 (c)(1),
(2) Date: Dec. 10, 2015

(87) PCT Pub. No.: WO2015/012348
PCT Pub. Date: Jan. 29, 2015

(65) Prior Publication Data
US 2016/0130431 A1 May 12, 2016

(30) Foreign Application Priority Data

Jul. 26, 2013 (JP) .................. 2013-155427
Jul. 26, 2013 (JP) .................. 2013-155428

(51) Int. Cl.
| | |
|---|---|
| B32B 27/38 | (2006.01) |
| C08J 5/24 | (2006.01) |
| C08L 63/00 | (2006.01) |
| C08G 59/24 | (2006.01) |
| C08G 59/28 | (2006.01) |
| C08G 59/38 | (2006.01) |
| C08G 59/50 | (2006.01) |
| C08G 59/32 | (2006.01) |

(52) U.S. Cl.
CPC .......... C08L 63/00 (2013.01); C08G 59/245 (2013.01); C08G 59/3218 (2013.01); C08G 59/502 (2013.01); C08J 5/24 (2013.01); *C08J 2363/00* (2013.01); *C08J 2400/22* (2013.01); *C08J 2400/26* (2013.01); *C08J 2453/00* (2013.01); *C08J 2477/00* (2013.01); *C08J 2481/06* (2013.01); *C08L 2205/025* (2013.01)

(58) Field of Classification Search
None
See application file for complete search history.

(56) References Cited

U.S. PATENT DOCUMENTS 4,847,011 A 7/1989 Dewhirst et al.
4,882,370 A * 11/1989 Jordan .................. C08G 59/226
523/200

5,985,431 A * 11/1999 Oosedo .................. C08G 59/20
428/297.4

(Continued)

FOREIGN PATENT DOCUMENTS

| EP | 2333010 A1 | 6/2011 |
|---|---|---|
| JP | 1-132541 A | 5/1989 |
| JP | 9-194571 A | 7/1997 |

(Continued)

OTHER PUBLICATIONS

Machine translation of JP 2012-102228 (no date).*
Machine translation of JP 2009-155256 (no date).*
International Search Report issued in PCT/JP2014/069550, dated Oct. 21, 2014.
Written Opinion issued in PCT/JP2014/069550, dated Oct. 21, 2014.
Extended European Search Report, dated Jan. 31, 2017, for European Application No. 14830258.1.

*Primary Examiner* — Michael J Feely
(74) *Attorney, Agent, or Firm* — Birch, Stewart, Kolasch & Birch, LLP

(57) ABSTRACT

An epoxy resin composition comprising the following constituents [A], [B], and [C]:
[A] an epoxy resin having a structure represented by a formula (1);

[Chem. Formula 1]

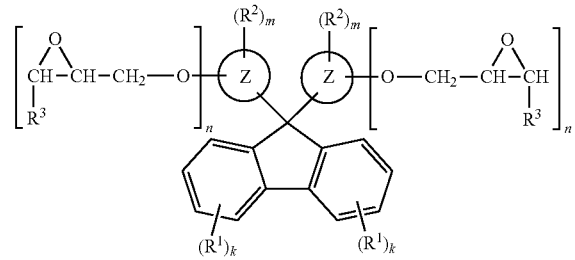

(1)

in which a ring Z represents a condensed polycyclic aromatic hydrocarbon ring, $R^1$ and $R^2$ represent a substituent, $R^3$ represents a hydrogen atom or a methyl group, k is an integer of 0 to 4, m is an integer of 0 or more, and n is an integer of 1 or more;
[B] at least one resin selected from the group consisting of the following [Bx], [By] and [Bz];
[Bx] a bisphenol type epoxy resin;
[By] an amine type epoxy resin; and
[Bz] a thermoplastic resin;
[C] a polyamine curing agent.
Provided is an epoxy resin composition which provides a cured product having excellent heat resistance, toughness and elastic modulus.

10 Claims, No Drawings

(56) References Cited

U.S. PATENT DOCUMENTS

2011/0184091 A1 7/2011 Mizuki et al.
2014/0309337 A1 10/2014 Nagano et al.

FOREIGN PATENT DOCUMENTS

| JP | 11-302412 A | 11/1999 |
| JP | 2005-298815 A | 10/2005 |
| JP | 2007-154160 A | 6/2007 |
| JP | 2009-155256 A | 7/2009 |
| JP | 2012-102228 A | 5/2012 |
| WO | WO 2010/035859 A1 | 4/2010 |
| WO | WO 2013/099862 A1 | 7/2013 |

* cited by examiner

EPOXY RESIN COMPOSITION, PREPREG, AND FIBER-REINFORCED COMPOSITE MATERIAL

TECHNICAL FIELD

The present invention relates to fiber-reinforced composite materials suitable for aerospace applications, prepregs from which to produce such materials, and epoxy resin compositions which are advantageously used as matrix resins for the prepregs.

BACKGROUND ART

In recent years, fiber-reinforced composite materials using reinforcing fibers such as carbon fiber and aramid fiber, owing to the high specific strength and specific elastic modulus thereof, have been used as structural materials of aircraft and motor vehicles, sporting applications such as tennis rackets, golf shafts, fishing rods and the like, general industrial uses, etc. Methods for producing the fiber-reinforced composite materials include a method of laminating a plurality of prepregs obtained as a sheet-like intermediate material including reinforcing fibers impregnated with an uncured matrix resin and then thermally curing the laminated prepregs, a resin transfer molding method of pouring a liquid resin into the reinforcing fibers arranged in a mold and then thermally curing the resin, etc.

Among these production methods, a method of using a prepreg has an advantage that a high performance fiber-reinforced composite material is easily obtained since orientation of reinforcing fibers can be strictly controlled and the degree of freedom of design of a laminate constitution is high. As the matrix resin used in the prepreg, from the viewpoint of heat resistance and productivity, thermosetting resins are mainly used. Particularly, epoxy resins are suitably used from the viewpoint of adhesion between a resin and reinforcing fibers, dimensional stability and mechanical properties such as strength and rigidity of the resulting composite material.

Among the epoxy resins, amine type epoxy resins which provide a cured product having a small epoxy equivalent and a high crosslinking density have been used as a matrix resin for a fiber-reinforced composite material for aerospace applications requiring excellent strength properties and durable stability. While the amine type epoxy resin provides a resin cured product having a high elastic modulus and high heat resistance, it tends to provide a resin cured product having its small ability to deform and low toughness.

Thus, methods of mixing a rubber component or a thermoplastic resin respectively excellent in toughness to form a with the epoxy resin have been tried as a method of improving the toughness of the epoxy resin. However, there have been problems that these methods tend to cause a reduction of elastic modulus, deterioration of heat resistance, deterioration of processability due to thickening, or quality loss such as void formation.

For this situation is proposed in recent years a method in which a fine phase separation structure is stably formed in a curing process of an epoxy resin by mixing a block copolymer such as a copolymer composed of a styrene-butadiene-methyl methacrylate or a block copolymer composed of butadiene-methyl methacrylate to significantly improve the toughness of an epoxy resin (Patent Document 1, Patent Document 2). However, in these techniques, there is still a tendency incapable of imparting adequate toughness to the epoxy resin since the amount of the block copolymer to be mixed has to be reduced to avoid the adverse effect on processability. A cured product of such an epoxy resin exhibits high water absorption in a high-temperature and high-humidity environment and has a problem that strength properties as the fiber-reinforced composite material are inadequate in a high-temperature and high-humidity environment.

As another method of improving the toughness of the epoxy resin, a method of using an epoxy resin in combination with a rigid epoxy resin which can provide strength properties and heat resistance while suppressing a crosslinking density, has been tried (Patent Documents 3 and 4). For example, Patent Document 4 discloses that it is possible to attain the toughness and the heat resistance by the combined use of the amine type epoxy resin and a fluorene type epoxy resin. However, in such a method, the elastic modulus of the resin cured product and the strength properties as the fiber-reinforced composite material may be still inadequate.

In recent years, the epoxy resin itself is being improved, an epoxy resin capable of significantly reducing the crosslinking density while ensuring heat resistance at a level of an aircraft material, has been developed. For example, Patent Document 5 discloses that extremely high heat resistance and an extremely high elastic modulus can be achieved simultaneously by curing a fluorene type epoxy resin having an introduced condensed polycyclic group with a phenol novolak resin. However, also in this case, the resulting resin cured product has been low in elongation and brittle and has not led to a significant improvement of toughness. Further, the amount of the epoxy resin to be mixed and the combination of the epoxy resin with another component have not been referred to at all, and it can be said that there are no findings concerning physical properties of an epoxy resin composition obtained by use of these epoxy resins.

PRIOR ART DOCUMENTS

Patent Documents

Patent Document 1: JP2007-154160A
Patent Document 2: WO 2010/035859A1
Patent Document 3: JP2005-298815A
Patent Document 4: JP2012-102228A

SUMMARY OF THE INVENTION

Problems to be Solved by the Invention

It is an object of the present invention to provide an epoxy resin composition which provides a cured product having excellent heat resistance, toughness and elastic modulus.

Solutions to the Problems

The present invention pertains to an epoxy resin composition comprising the following constituents [A], [B], and [C]:

[A] an epoxy resin having a structure represented by a formula (1);

[Chem. Formula 1]

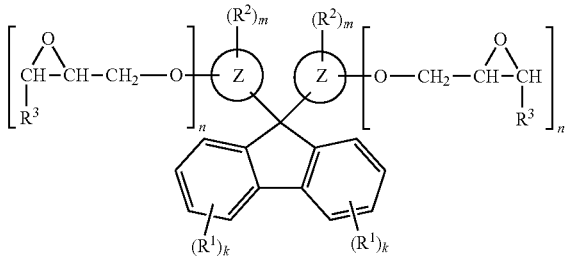

in which a ring Z represents a condensed polycyclic aromatic hydrocarbon ring, $R^1$ and $R^2$ represent a substituent, $R^3$ represents a hydrogen atom or a methyl group, k is an integer of 0 to 4, m is an integer of 0 or more, and n is an integer of 1 or more;

[B] at least one resin selected from the group consisting of the following [Bx], [By] and [Bz];
[Bx] a bisphenol type epoxy resin;
[By] an amine type epoxy resin; and
[Bz] a thermoplastic resin;
[C] a polyamine curing agent.

A first preferred aspect of the present invention is the above-mentioned epoxy resin composition comprising the constituents [A], [Bx], and [C], wherein in 100 parts by mass of the total amount of epoxy resins, the constituent [A] is contained in an amount of 10 to 70 parts by mass and the constituent [Bx] is contained in an amount of 20 to 80 parts by mass.

A second preferred aspect of the present invention is the above-mentioned epoxy resin composition comprising the constituents [A], [By], and [C].

A third preferred aspect of the present invention is the above-mentioned epoxy resin composition comprising the constituents [A], [Bz], and [C], wherein a glass transition temperature (Tg) of the thermoplastic resin [Bz] is 150° C. or higher.

Another aspect of the present invention pertains to a prepreg formed by impregnating reinforcing fibers with the epoxy resin composition according to any one of the above-mentioned paragraphs.

Another aspect of the present invention pertains to a fiber-reinforced composite material containing reinforcing fibers and a cured product of the epoxy resin composition according to any one of the above-mentioned paragraphs.

Effects of the Invention

According to the present invention, it is possible to obtain an epoxy resin composition which provides a cured product having excellent heat resistance, toughness and elastic modulus.

Further, according to the first preferred aspect of the present invention, it is possible to obtain an epoxy resin composition which provides a cured product further having excellent moist-heat resistance.

According to the second preferred aspect of the present invention, it is possible to obtain an epoxy resin composition which provides a cured product further having excellent strength properties.

According to the third preferred aspect of the present invention, it is possible to obtain an epoxy resin composition which provides a cured product exhibiting extremely high toughness.

EMBODIMENTS OF THE INVENTION

An epoxy resin composition of the present invention comprises the following constituents [A], [B], and [C]:
[A] an epoxy resin having a structure represented by a formula (1);

[Chem. Formula 2]

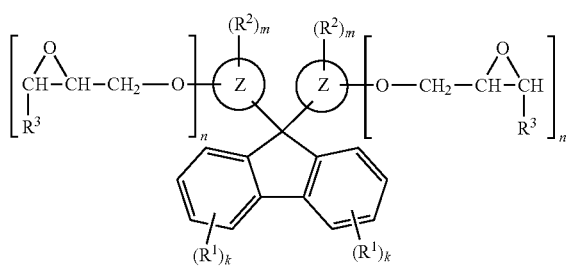

(1)

in which a ring Z represents a condensed polycyclic aromatic hydrocarbon ring, $R^1$ and $R^2$ represent a substituent, $R^3$ represents a hydrogen atom or a methyl group, k is an integer of 0 to 4, m is an integer of 0 or more, and n is an integer of 1 or more;
[B] at least one resin selected from the group consisting of the following [Bx], [By] and [Bz];
[Bx] a bisphenol type epoxy resin;
[By] an amine type epoxy resin; and
[Bz] a thermoplastic resin;
[C] a polyamine curing agent.

By having such composition, it is possible to obtain an epoxy resin composition which provides a cured product having excellent heat resistance, toughness and elastic modulus. The fiber-reinforced composite material excellent in compression strength and interlaminar fracture toughness can be obtained by using such an epoxy resin composition.

When the epoxy resin composition contains the epoxy resin [A] having the structure represented by the formula (1), water absorption of the cured product is suppressed even in a high-temperature and high-humidity environment, and heat resistance and a resin elastic modulus can be held. Further, thereby, a high compression strength of the resulting fiber-reinforced composite material can be maintained.

In the formula (1), examples of the condensed polycyclic aromatic hydrocarbon rings represented by the ring Z include condensed dicyclic to tetracyclic hydrocarbon rings such as condensed dicyclic hydrocarbon rings (preferably, $C_{8-20}$ condensed dicyclic hydrocarbon rings such as an indene ring and a naphthalene ring, and more preferably $C_{10-16}$ rings) and condensed tricyclic hydrocarbon ring (preferably, an anthracene ring, a phenanthrene ring, etc.). Examples of preferred condensed polycyclic aromatic hydrocarbon rings includes the naphthalene ring, the anthracene ring and the like, and the naphthalene ring is particularly preferred. In addition, in the formula (1), two rings Z may be the same ring or may be separate rings.

A bond position of the ring Z bonded to a ninth position of fluorene is not particularly limited, and when the ring Z is a naphthyl ring, the position may be any of 1-naphthyl and 2-naphthyl. The position is particularly preferably 2-naphthyl.

Further, in the formula (1), examples of the substituent $R^1$ include unreactive substituents such as cyano groups, halogen atoms, hydrocarbon groups and the like. Among these substituents, halogen atoms, cyano groups and alkyl groups are preferred, and alkyl groups are particularly preferred.

Examples of the halogen atom include a fluorine atom, a chlorine atom, a boron atom and the like.

Examples of the hydrocarbon groups include alkyl groups, aryl groups and the like. The alkyl group is preferably $C_{1-6}$ alkyl groups, and more preferably $C_{1-4}$ alkyl groups. Specific examples of the alkyl group include a methyl group, an ethyl group, a propyl group, an isopropyl group, a butyl group, a t-butyl group and the like, and the methyl group is particularly preferred. The aryl group is preferably $C_{6-10}$ aryl groups, and particularly preferably a phenyl group.

In addition, when k is 2 or more, the groups $R^1$ may be different or may be the same. The groups $R^1$ to be substituted for two benzene rings constituting fluorene may be the same or may be different. A position of the benzene ring at which the group $R^1$ is bonded to the benzene ring constituting fluorene (a substitution position) is not particularly limited. A preferred number of substitutions k is 0 to 1 and 0 is particularly preferred. In addition, in two benzene rings constituting fluorene, the number of substitutions k may be the same or may be different.

Examples of the substituent $R^2$ include hydrocarbon groups such as an alkyl group, a cycloalkyl group, an aryl group and an aralkyl group; groups represented by a general formula —$OR^4$ ($R^4$ indicates hydrocarbon group exemplified above) such as an alkoxy group, a cycloalkoxy group and an aryloxy group; groups represented by a general formula —$SR^4$ ($R^4$ is the same as above) such as an alkylthio group; an acyl group; an alkoxycarbonyl group; a halogen atom; a hydroxyl group; a nitro group; a cyano group; a substituted amino group and the like.

The alkyl group is preferably $C_{1-12}$ alkyl groups, more preferably $C_{1-8}$ alkyl groups, and moreover preferably $C_{1-6}$ alkyl groups. Specific examples of the alkyl group include a methyl group, an ethyl group, a propyl group, an isopropyl group, a butyl group and the like.

The cycloalkyl group is preferably $C_{5-8}$ cycloalkyl groups, and more preferably $C_{5-6}$ cycloalkyl groups.

The aryl group is preferably $C_{6-14}$ aryl groups, more preferably $C_{6-10}$ aryl groups, and moreover preferably $C_{6-8}$ aryl groups. Specifically, a phenyl group, a tolyl group, a xylyl group and the like are preferred.

The aralkyl group is preferably $C_{6-10}$ aryl-$C_{1-4}$ alkyl groups such as a benzyl group and a phenethyl group.

The alkoxy group is preferably $C_{1-8}$ alkoxy groups, and more preferably $C_{1-6}$ alkoxy groups. Specific examples of the alkoxy group include a methoxy group and the like.

The cycloalkoxy group is preferably $C_{5-10}$ cycloalkyloxy groups.

The aryloxy group is preferably $C_{6-10}$ aryloxy groups.

The alkylthio group is preferably $C_{1-8}$ alkylthio groups, and more preferably $C_{1-6}$ alkylthio groups. Specific examples of the alkylthio group include a methylthio group and the like.

The acyl group is preferably $C_{1-6}$ acyl groups. Specific examples of the acyl group include an acetyl group and the like.

The alkoxycarbonyl group is preferably $C_{1-4}$ alkoxycarbonyl groups. Specific examples of the alkoxycarbonyl group include a methoxycarbonyl group.

Examples of the halogen atom include a fluorine atom, a chlorine atom, a boron atom, an iodine atom and the like.

Examples of the substituted amino group include dialkylamino groups and the like. Herein, examples of the alkyl include the above-mentioned alkyl groups. Specific examples thereof include a dimethylamino group.

Among groups, a preferred substituent $R^2$ is a group selected from among hydrocarbon groups, alkoxy groups, cycloalkoxy groups, aryloxy groups, aralkyloxy groups, acyl groups, halogen atoms, nitro groups, cyano groups and substituted amino group, and particularly preferred substituent $R^2$ is a group selected from among hydrocarbon groups, alkoxy groups and halogen atoms.

In addition, in the same ring Z, when m is 2 or more, the groups $R^2$ may be different or may be the same. In two rings Z, the groups $R^2$ may be the same or may be different. The number of substitutions m is preferably 0 to 8, more preferably 0 to 6, more preferably 1 to 5, moreover preferably 0 to 4, particularly 0 to 2, and most preferably 0 to 1. In addition, in two rings Z, the number of substitutions m may be the same or may be different.

In addition, in the formula (1), a group $R^3$ is a hydrogen atom or a methyl group, and preferably the hydrogen atom.

In the formula (1), the number of substitutions n is 1 or more, preferably 1 to 4, more preferably 1 to 3, moreover preferably 1 to 2, and particularly preferably 1. In addition, the number of substitutions n may be the same or may be different in each ring Z. In addition, a position of the ring Z at which the epoxy group is bonded to the ring Z is not particularly limited, and the epoxy group may be bonded to an appropriate position of the ring Z. Particularly, the epoxy group is preferably bonded to a separate hydrocarbon ring (for example, a fifth position or a sixth position of a naphthalene ring) from the hydrocarbon ring bonded to a ninth position of fluoren in the condensed polycyclic hydrocarbon ring constituting the ring Z.

Examples of specific compounds represented by the formula (1) include compounds, such as 9,9-bis(glycidyloxynaphthyl)fluorene, in which n is 1 in the formula (1). Specific examples thereof include 9,9-bis(6-glycidyloxy-2-naphthyl)fluorene, 9,9-bis(5-glycidyloxy-1-naphthyl)fluorene and the like.

Next, a method for producing the epoxy resin [A] having the structure represented by the formula (1) will be described by example. The compound represented by the formula (1) is not particularly limited, and for example, the compound can be produced by reacting a compound represented by the following formula (2) (e.g., 9,9-bis(hydroxynaphthyl)fluorene) with a compound represented by the following formula (3). For example, the compound can be produced by a method described in Patent Document 4.

[Chem. Formula 3]

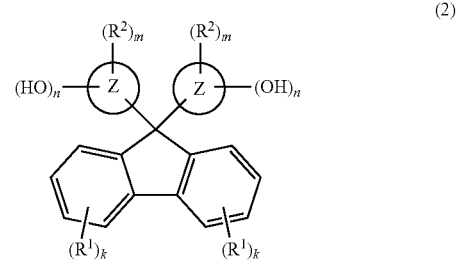

(2)

[Chem. Formula 4]

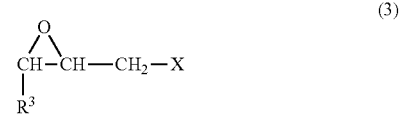

(3)

In the formula (3), X represents a halogen atom. Z, $R^1$, $R^2$, k, m and n are the same as in the formula (1). Examples of the halogen atom include a chlorine atom, a bromine atom, an iodine atom and the like, and the chlorine atom or the bromine atom is preferred and the chlorine atom is particularly preferred. Examples of specific compounds represented by the formula (3) include epihalohydrin (also referred to as halomethyloxirane), 1-halomethyl-2-methyloxirane and the like. Specific examples of epihalohydrin include epichlorohydrin (chloromethyloxirane), epibromohydrin (bromomethyloxirane) and the like. Specific examples of 1-halomethyl-2-methyloxirane include 1-chloromethyl-2-methyloxirane and the like.

When the epoxy resin composition contains the bisphenol type epoxy resin [Bx], a crosslinking density of the cured product can be lowered while maintaining its heat resistance, and therefore a resin cured product with high toughness can be obtained.

The bisphenol type epoxy resin [Bx] is not particularly limited, and a bisphenol A type epoxy resin, a bisphenol F type epoxy resin, a bisphenol AD type epoxy resin, a bisphenol S type epoxy resin, or bisphenol type epoxy resins having a halogen-substituted, alkyl-substituted, or hydrogenated bisphenol skeleton, are used. Specific examples of such epoxy resins include the following epoxy resins.

Examples of commercially available products of the bisphenol A type epoxy resins include "EPOTOHTO (registered trademark)" YD128 (NIPPON STEEL & SUMIKIN CHEMICAL CO., LTD.), and "jER (registered trademark)" 825, "jER (registered trademark)" 828, "jER (registered trademark)" 834, "jER (registered trademark)" 1001, "jER (registered trademark)" 1004, "jER (registered trademark)" 1007, "jER (registered trademark)" 1009 and "jER (registered trademark)" 1010 (all produced by Mitsubishi Chemical Corp.).

Examples of commercially available products of the bisphenol F type epoxy resin include "jER (registered trademark)" 806, "jER (registered trademark)" 807, "jER (registered trademark)" 4004P, "jER (registered trademark)" 4007P, "jER (registered trademark)" 4009P, "jER (registered trademark)" 4010P (all produced by Mitsubishi Chemical Corp.), and "EPOTOHTO (registered trademark)" YDF170, "EPOTOHTO (registered trademark)" YDF2001 (NIPPON STEEL & SUMIKIN CHEMICAL CO., LTD.).

Examples of commercially available products of the bisphenol S type epoxy resin include "EPICLON (registered trademark)" EXA-1514 (produced by DIC Corporation).

Among the bisphenol type epoxy resins [Bx], a liquid bisphenol F type epoxy resin is particularly preferably used since the elastic modulus of the resulting cured product can be increased and the heat resistance of the cured product can be maintained. In addition, the liquid bisphenol F type epoxy resin refers to a bisphenol F type epoxy resin which is liquid at room temperature (25° C.). With respect to the term "liquid" referred to herein, when a metal piece with a specific gravity of 7 or more in the same temperature condition as that of an epoxy resin to be measured is placed on the epoxy resin and it sinks instantly by gravity, the epoxy resin is defined as being liquid. Examples of the metal with a specific gravity of 7 or more include iron (steel), cast iron, copper and the like.

By mixing the amine type epoxy resin [By] in the epoxy resin composition, the elastic modulus of a cured product is improved, and the effect of improving the strength of the fiber-reinforced composite material is exerted.

Examples of the amine type epoxy resin [By] preferably used include tetraglycidyldiaminodiphenyl methane, tetraglycidyldiaminodiphenyl sulfone, triglycidylaminophenol, triglycidylaminocresol, diglycidylaniline, diglycidyltoluidine, tetraglycidylxylylenediamine, halogen-substituted product thereof, alkyl-substituted product thereof, and hydrogenated product thereof. Among these, a polyfunctional amine type epoxy resin having three or more glycidyl groups is preferred, and tetraglycidyldiaminodiphenyl methane and triglycidylaminophenol are more preferred.

Examples of commercially available products of the tetraglycidyldiaminodiphenyl methane include "SUMI-EPDXY (registered trademark)" ELM434 (produced by Sumitomo Chemical Co., Ltd.), YH434L (NIPPON STEEL & SUMIKIN CHEMICAL CO., LTD.), "jER (registered trademark)" 604 (produced by Mitsubishi Chemical Corp.), "Araldite (registered trademark)" MY720 and "Araldite (registered trademark)" MY721 ((all manufactured by HUNTSMAN ADVANCED MATERIALS).

Examples of commercially available products of the tetraglycidyldiaminodiphenyl sulfone include TG3DAS (produced by Mitsui Fine Chemicals, Inc.) and the like.

Examples of commercially available products of the triglycidylaminophenol or triglycidylaminocresol include "SUMI-EPDXY (registered trademark)" ELM100, "SUMI-EPDXY (registered trademark)" ELM120 (produced by Sumitomo Chemical Co., Ltd.), "Araldite (registered trademark)" MY0500, "Araldite (registered trademark)" MY0510 and "Araldite (registered trademark)" MY0600 (all manufactured by HUNTSMAN ADVANCED MATERIALS), "jER (registered trademark)" 630 (produced by Mitsubishi Chemical Corp.).

Examples of commercially available products of the diglycidylaniline include GAN (produced by Nippon Kayaku Co., Ltd.) and PxGAN (produced by Toray Fine Chemicals Co., Ltd.).

Examples of commercially available products of the diglycidyltoluidineinclude GOT (produced by Nippon Kayaku Co., Ltd.).

Examples of commercially available products of the tetraglycidylxylylenediamine and hydrogenated product thereof include "TETRAD (registered trademark)"-X and "TETRAD (registered trademark)"-C (all produced by Mitsubishi Gas Chemical Co., Ltd.).

Further, the epoxy resin composition of the present invention may contain other epoxy resin components as the epoxy resin within a range which does not impair the effect of the present invention. These other epoxy resin components may be added singly or may be added in combination of plural kinds. Specific examples thereof include phenol novolak type epoxy resins, cresol novolak type epoxy resins, resorcinol-type epoxy resins, dicyclopentadiene type epoxy resins, epoxy resins having a biphenyl skeleton, urethane and isocyanate-modified epoxy resins, and epoxy resins having a fluorene skeleton.

Examples of commercially available products of the phenol novolak type epoxy resins include "jER (registered trademark)" 152, "jER (registered trademark)" 154 (produced by Mitsubishi Chemical Corp.), "EPICLON (registered trademark)" N-740, "EPICLON (registered trademark)" N-770 and "EPICLON (registered trademark)" N-775 (produced by DIC Corporation).

Examples of commercially available products of the cresol novolak type epoxy resins include "EPICLON (registered trademark)" N-660, "EPICLON (registered trademark)" N-665, "EPICLON (registered trademark)" N-670, "EPICLON (registered trademark)" N-673, and "EPICLON (registered trademark)" N-695 (all produced by DIC Corporation), and EOCN-1020, EOCN-102S, EOCN-104S (all produced by Nippon Kayaku Co., Ltd.).

Specific examples of the resorcinol type epoxy resins include "DENACOL (registered trademark)" EX-201 (produced by Nagase ChemteX Corporation).

Examples of commercially available products of the dicyclopentadiene type epoxy resins include "EPICLON (registered trademark)" HP7200, "EPICLON (registered trademark)" HP7200L and "EPICLON (registered trademark)" HP7200H (all produced by DIC Corporation), Tactix 558 (produced by HUNTSMAN ADVANCED MATERIALS), and XD-1000-1L, XD-1000-2L (all produced by Nippon Kayaku Co., Ltd.).

Examples of commercially available products of the epoxy resin having a biphenyl skeleton include "jER (registered trademark)" YX4000H, "jER (registered trademark)" YX4000, and "jER (registered trademark)" YL6616 (produced by Mitsubishi Chemical Corp.), and NC-3000 (produced by Nippon Kayaku Co., Ltd.).

Examples of commercially available products of the urethane and isocyanate-modified epoxy resins include AER4152 (produced by Asahi Kasei E-materials Corporation) having an oxazolidone ring and ACR1348 (produced by Asahi Denka Co., Ltd.).

Examples of commercially available products of the epoxy resins having a fluorene skeleton include "ESF (registered trademark)" 300 (NIPPON STEEL & SUMIKIN CHEMICAL CO., LTD.), and "Oncoat (registered trademark)" EX-1010, EX-1011, EX-1012, EX-1020, EX-1030, EX-1040, EX-1050, EX-1051 (all produced by Nagase ChemteX Corporation).

When the thermoplastic resin [Bz] is mixed or dissolved in the epoxy resin composition for use, high toughness of the thermoplastic resin [Bz] compensates for the brittleness of an epoxy resin and the epoxy resin compensates for the difficulty in molding of the thermoplastic resin [Bz] to form a base resin in which the balance is achieved.

Such as a thermoplastic resin [Bz] is preferably a thermoplastic resin generally having, in a main chain, a bond selected from the group consisting of a carbon-carbon bond, an amide bond, an imide bond, an ester bond, an ether bond, a carbonate bond, a urethane bond, a thioether bond, a sulfone bond and a carbonyl bond. Further, the thermoplastic resin [Bz] may partially have a crosslinking structure, may have crystallinity, or may be amorphous. Particularly is suitable at least one resin selected form the group consisting of polyamide, polycarbonate, polyacetal, polyphenylene oxide, polyphenylene sulfide, polyallylate, polyester, polyamide-imide, polyimide, polyetherimide, polyimide having a phenyltrimethylindane structure, polysulfone, polyethersulfone, polyetherketone, polyetheretherketone, polyaramide, polyether nitorile, polybenzimidazole, polyvinyl acetals, such as polyvinyl formal and polyvinyl butyral, polyvinyl alcohol, phenoxy and polyvinyl pyrrolidone.

Particularly, polyvinyl formal and polyethersulfone can be suitably used because of excellent compatibility with an epoxy resin. Examples of commercially available products of the polyvinyl formal include "DENKA FORMAL (registered trademark)" (produced by Denka Co., Ltd.) and "VINYLEC (registered trademark)" (produced by Chisso Corporation). Further, examples of commercially available products of the polyethersulfone include "SUMIKAEXCEL (registered trademark)" PES5200P, "SUMIKAEXCEL (registered trademark)" PES4700P, "SUMIKAEXCEL (registered trademark)" PES3600P, "SUMIKAEXCEL (registered trademark)" PES5003P, "SUMIKAEXCEL (registered trademark)" PES5200P and "SUMIKAEXCEL (registered trademark)" PES7600P (all produced by Sumitomo Chemical Co., Ltd.), "Ultrason (registered trademark)" E2020P SR and "Ultrason (registered trademark)" E2021P SR (all produced by BASF Japan Ltd.), and "GAFONE (registered trademark)" 3600RP, "GAFONE (registered trademark)" 3000RP (all produced by Solvay Advanced Polymers Japan K.K.). Further, polyethersulfone-polyether ether sulfone copolymer oligomers as described in Published Japanese Translation No. 2004-506789, and "ULTEM (registered trademark)" 1000, "ULTEM (registered trademark)" 1010 and "ULTEM (registered trademark)" 1040 (all produced by Solvay Advanced Polymers Japan K.K.) which are commercially available products of the polyetherimide. The oligomer refers to a polymer having a relatively low molecular weight in which a finite number, about 10 to 100, of monomers are bonded.

Examples of commercially available products of the thermoplastic resin which is soluble in an epoxy resin and has a hydrogen bonding functional group include DENKA BUTYRAL and DENKA FORMAL (produced by Denka Co., Ltd.), "VINYLEC (registered trademark)" (produced by Chisso Corporation) as polyvinyl acetal resins; "UCAR (registered trademark)" PKHP (produced by Union Carbide Corporation) as the phenoxy resins; "Macromelt (registered trademark)" (produced by Henkel Hakusui Corporation), "AMILAN (registered trademark)" CM4000 (produced by Toray Industries, Inc.) as polyamide resins; "ULTEM (registered trademark)" (produced by General Electrics Co., Ltd.), "Matrimid (registered trademark)" 5218 (produced by Ciba Specialty Chemicals Inc) as polyimide; "Victrex (registered trademark)" (produced by Mitsui Chemicals, Inc.), "UDEL (registered trademark)" (produced by Union Carbide Corporation) as polysulfone; and "Luviskol (registered trademark)" (produced by BASF Japan Ltd.) as polyvinyl pyrrolidone.

Particularly, in order to attain good heat resistance, the glass transition temperature (Tg) of the thermoplastic resin [Bz] is preferably 150° C. or higher, and more preferably 170° C. or higher. When the glass transition temperature of the thermoplastic resin [Bz] is lower than 150° C., a cured product may tend to be deformed due to heat in being used as a molded body.

With respect to such a thermoplastic resin [Bz], it is also a suitable aspect to mix or dissolve thermoplastic resin particles in the epoxy resin composition for use. By mixing the thermoplastic resin particles, the toughness of a matrix resin is improved, and in the case of forming a fiber-reinforced composite material, impact resistance is improved.

As a material of the thermoplastic resin particles, polyamide is most preferred, and among polyamide, nylon 12, nylon 6, nylon 11, nylon 6-nylon 12 copolymer, or nylon converted to a semi-IPN (interpenetrating polymer network structure) (semi-IPN nylon) by an epoxy compound described in Example 1 of JPH01-104624A, provides particularly high strength of adhesion to a thermosetting resin. With respect to a shape of the thermoplastic resin particle, spherical particles or non-spherical particles may be used, or porous particles may be used; however, the spherical particle is a preferred aspect in that the spherical particle is excellent in viscoelasticity since it less deteriorates flow properties of a resin, and it does not become a starting point of stress concentration to provide high impact resistance. Examples of commercially available products of the polyamide particles include SP-500 (produced by Toray Industries, Inc.), "TORAYPEARL (registered trademark)" TN (produced by Toray Industries, Inc.), "Orgasol (registered trademark)" 1002D (produced by ATOCHEM), "Orgasol (registered trademark)" 2002 (produced by ATOCHEM), "Orgasol (registered trademark)" 3202 (produced by ATOCHEM), TROGAMID T5000 and the like.

The polyamine curing agent [C] is a curing agent for an epoxy resin contained in the epoxy resin composition and a compound having an active group capable of reacting with an epoxy group. Examples of the polyamine curing agent [C] include dicyanediamide, aromatic polyamine, imidazole derivatives, aliphatic amines, tetramethylguanidine, and thiourea added amines. Among these, aromatic polyamine is suitable, and diaminodiphenylsulfone or derivatives thereof, or various isomers thereof are more preferred. Specifically, 3,3'-diaminodiphenylsulfone, 4,4'-diaminodiphenylsulfone and combinations thereof are particularly preferably used since they are excellent in heat resistance or mechanical characteristics.

Further, when combinations consisting of dicyanediamide and a urea compound such as 3,4-dichlorophenyl-1,1-dimethylurea, or imidazoles are used as a curing agent, high heat resistance and high water resistance can be achieved while curing at a relatively low temperature. In another case, when any of these curing agents made latent, for example, a microencapsulated curing agent is used, storage stability of the prepreg, particularly, tackiness and drape hardly changes even though being left standing at room temperature.

An optimum value of the additive amount of such a polyamine curing agent [C] varies depending on the types of the epoxy resin and the curing agent; however, it is preferred to adjust the additive amount such that a ratio of the amount of an active hydrogen of the polyamine curing agent [C] to the amount of the epoxy group of the epoxy resin is 0.6 to 1.2, and when the additive amount is more preferably adjusted so as to be 0.7 to 0.9, a resin having a higher elastic modulus than the case of using the curing agent in an equivalent amount may be obtained. These curing agents may be used singly or plural curing agents may be used in combination.

Examples of commercially available products of the aromatic polyamine include SEIKACURE-S (produced by Wakayama Seika Kogyo Co., Ltd.), MDA-220 (produced by Mitsubishi Chemical Corp.), "jER CURE (registered trademark)" W (produced by Mitsubishi Chemical Corp.), 3,3'-DAS (produced by Mitsui Chemicals, Inc.), "Lonzacure (registered trademark)" M-DEA (produced by Lonza Japan Ltd.), "Lonzacure (registered trademark)" M-DIPA (produced by Lonza Japan Ltd.), "Lonzacure (registered trademark)" M-MIPA (produced by Lonza Japan Ltd.) and "Lonzacure (registered trademark)" DETDA 80 (produced by Lonza Japan Ltd.).

Further, a product obtained by a preliminary reaction or a partial preliminary reaction between these epoxy resins and polyamine curing agents [C] may be mixed in the composition. Sometimes this method is effective for viscosity adjustment or an improvement of storage stability.

Hereinafter, the epoxy resin composition in the first preferred aspect of the present invention will be described in detail.

The epoxy resin composition of the present aspect contains the epoxy resin [A] having the structure represented by the formula (1), the bisphenol type epoxy resin [Bx], and the polyamine curing agent [C].

The epoxy resin [A] having the structure represented by the formula (1) is contained preferably in an amount of 10 to 70 parts by mass, and more preferably in an amount of 30 to 50 parts by mass in 100 parts by mass of the total amount of epoxy resins. When the amount of the epoxy resin [A] is in this range, water absorption of the cured product is suppressed even in a high-temperature and high-humidity environment, and heat resistance and a resin elastic modulus can be held. Further, thereby, the resulting fiber-reinforced composite material has a high compression strength.

The bisphenol type epoxy resin [Bx] is contained preferably in an amount of 20 to 80 parts by mass, and more preferably in an amount of 40 to 60 parts by mass in 100 parts by mass of the total amount of epoxy resins. When the amount of the bisphenol type epoxy resin [Bx] is in this range, a crosslinking density of the cured product can be lowered while maintaining its heat resistance, and therefore a resin cured product with high toughness can be obtained.

According to this aspect, it is possible to obtain an epoxy resin composition which provides a cured product further having excellent moist-heat resistance. The fiber-reinforced composite material excellent in the compression strength and the interlaminar fracture toughness in a high-temperature and high-humidity environment can be obtained by using such an epoxy resin composition.

Further, in the present aspect, the amine type epoxy resin [By] is preferably further contained in an amount of 10 to 50 parts by mass in 100 parts by mass of the total amount of epoxy resins. By mixing the amine type epoxy resin [By], the elastic modulus of a cured product is improved, and the effect of improving the strength of the fiber-reinforced composite material is exerted. When the content of the amine type epoxy resin [By] is less than 10 parts by mass, the effect of improving the elastic modulus of a cured product may be low. When the content is more than 50 parts by mass, a crosslinking density and a water absorption of the cured product may be increased.

Further, in the present aspect, by further mixing or dissolving the thermoplastic resin [Bz] in the epoxy resin composition for use to compensate for the brittleness of an epoxy resin with high toughness of the thermoplastic resin [Bz] and to compensate for the difficulty in molding of the thermoplastic resin [Bz] with an epoxy resin, a base resin in which the balance is achieved is formed, and therefore it is preferred. The amount of the thermoplastic resin [Bz] to be mixed is preferably 2 to 30 parts by mass, and more preferably 5 to 20 parts by mass with respect to 100 parts by mass of the total amount of epoxy resins from the viewpoint of a balance.

Hereinafter, the epoxy resin composition in the second preferred aspect of the present invention will be described in detail.

The epoxy resin composition of the present aspect contains the epoxy resin [A] having the structure represented by the formula (1), the amine type epoxy resin [By], and the polyamine curing agent [C].

By mixing the amine type epoxy resin [By], the elastic modulus of a cured product is improved, and the effect of improving the strength of the fiber-reinforced composite material is exerted. Thereby, it is possible to obtain an epoxy resin composition which provides a cured product further having excellent strength properties. The fiber-reinforced composite material excellent in the tensile strength, the compression strength and the interlaminar fracture toughness can be obtained by using such an epoxy resin composition.

With respect to the amounts of the epoxy resin [A] having the structure represented by the formula (1) and such an amine type epoxy resin [By] to be respectively mixed, preferably, the [A] is contained in an amount of 10 to 50 parts by mass and the [By] is contained in an amount of 10 to 50 parts by mass in 100 parts by mass of the total amount of epoxy resins, and more preferably, the [A] is contained in an amount of 20 to 40 parts by mass and the [By] is contained in an amount of 20 to 40 parts by mass since a resin cured product has the good balance between its characteristics and develops particularly excellent strength properties.

Further, in the present aspect, the bisphenol type epoxy resin [Bx] is preferably further contained in an amount of 20 to 50 parts by mass in 100 parts by mass of the total amount of epoxy resins. By mixing the bisphenol type epoxy resin [Bx], a crosslinking density of the cured product can be lowered while maintaining its heat resistance, and therefore a resin cured product with high toughness can be obtained. When the content of the [Bx] is less than 20 parts by mass, the toughness of a cured product may be lowered. When the content of the [Bx] is more than 50 parts by mass, the heat resistance of a cured product may be lowered.

In the present aspect, it is preferred to further mix or dissolve the thermoplastic resin [Bz] in the epoxy resin composition described above for use. A mixture of the epoxy resin and the thermoplastic resin [Bz] effects a better result than the case of using the epoxy resin and the thermoplastic resin [Bz] singly. It is possible to compensate for the brittleness of an epoxy resin with high toughness of the thermoplastic resin [Bz] and to compensate for the difficulty in molding of the thermoplastic resin [Bz] with the epoxy resin to form a base resin in which the balance is achieved.

The amount of the thermoplastic resin [Bz] to be mixed is preferably 2 to 30 parts by mass, and more preferably 5 to 20 parts by mass with respect to 100 parts by mass of the total amount of epoxy resins from the viewpoint of a balance.

Hereinafter, the epoxy resin composition in the third preferred aspect of the present invention will be described in detail.

The epoxy resin composition of the present aspect contains the epoxy resin [A] having the structure represented by the formula (1), the thermoplastic resin [Bz], and the polyamine curing agent [C].

In the present aspect, by mixing the epoxy resin [A] having the structure represented by the formula (1), a high elastic modulus and heat resistance are developed, and in combination with the thermoplastic resin [Bz], the toughness of a cured product is outstandingly improved and the effect on the tensile elongation of the fiber-reinforced composite material is exerted. Thereby, it is possible to obtain an epoxy resin composition which provides a cured product exhibiting extremely high toughness. The fiber-reinforced composite material excellent in the tensile strength, the compression strength and the interlaminar fracture toughness can be obtained by using such an epoxy resin composition.

The amount of such a thermoplastic resin [Bz] to be mixed is preferably 2 to 30 parts by mass, and more preferably 5 to 20 parts by mass with respect to 100 parts by mass of the total amount of epoxy resins from the viewpoint of a balance.

The epoxy resin [A] having the structure represented by the formula (1) is contained preferably in an amount of 10 to 70 parts by mass, and more preferably in an amount of 30 to 50 parts by mass in 100 parts by mass of the total amount of epoxy resins. When the mixed amount of the thermoplastic resin [Bz] is in this range, water absorption of the cured product is suppressed even in a high-temperature and high-humidity environment, and heat resistance and a resin elastic modulus can be held. Further, thereby, a high compression strength as the fiber-reinforced composite material can be maintained.

Further, in the present invention, it is also a suitable aspect to further mix an elastomer [D] in the above-mentioned epoxy resin composition. Such an elastomer [D] is mixed for the purpose of forming a fine elastomer phase in a phase of a cured epoxy matrix. Thereby, plane strain generated during stress load to the resin cured product can be resolved by destructive cavitation of an elastomer phase, resulting in the induction of a plastic deformation of the epoxy matrix phase, and consequently this causes large energy absorption to lead to an improvement of interlaminar fracture toughness of the fiber-reinforced composite material.

The elastomer is a polymer material having a domain whose glass transition temperature is 20° C. or lower, and examples thereof include a liquid rubber, a solid rubber, crosslinked rubber particles, core-shell rubber particles, a thermoplastic elastomer, a block copolymer having a block whose glass transition temperature is 20° C. or lower, and the like. Among these elastomers, a material selected from among the block copolymer including a block whose glass transition temperature is 20° C. or lower and the rubber particles, is preferred as the elastomer [D]. Thereby, a fine elastomer phase can be introduced while minimizing compatibility of the elastomer with the epoxy resin, and therefore it is possible to significantly improve the interlaminar fracture toughness of the fiber-reinforced composite material while reducing deterioration of heat resistance or elastic modulus.

Particularly, when such an elastomer [D] is used in conjunction with the epoxy resin [A] having the structure represented by the formula (1), the amine type epoxy resin [By] and the polyamine curing agent [C], the epoxy resin composition becomes a state in which an elastomer phase is introduced into the epoxy matrix phase moderately low in the crosslinking density, and the plastic of the epoxy matrix phase due to resolution of a state of plane strain is enhanced, and consequently the effect of improving the interlaminar fracture toughness becomes remarkable. Further, as a result of this, it is possible to keep the amount of the elastomer to be mixed down, and it becomes possible to minimize adverse effects such as an viscosity increase of the epoxy resin composition, an elastic modulus reduction or deterioration of heat resistance of the resin cured product.

As rubber particles, crosslinked rubber particles and core-shell rubber particles, produced by growing a dissimilar polymer on the surface of crosslinked rubber particles through graft polymerization, are preferably used from the viewpoint of handleability, etc. Primary particle diameters of such rubber particles are preferably in the range of 50 to 300 μm, and particularly preferably in the range of 80 to 200 μm. Further, such rubber particles are preferably particles having a good affinity for the epoxy resin to be used and not producing secondary aggregation in preparing a resin or in molding and curing.

As commercially available products of crosslinked rubber particles, FX501P (produced by Japan Synthetic Rubber Co., Ltd.) which comprises a crosslinked product of a carboxyl-modified butadiene-acrylonitrile copolymer, CX-MN series (produced by Nippon Shokubai Co., Ltd.) which comprises acrylic rubber fine particles, YR-500 series (produced by NIPPON STEEL & SUMIKIN CHEMICAL CO., LTD.) and the like, can be used.

As commercially available products of the core-shell rubber particles, for example, butadiene-alkyl methacrylate-styrene copolymer "Paraloid (registered trademark)" EXL-2655 (produced by Kureha Chemical Industry Co., Ltd.), acrylic acid ester-methacrylic acid ester copolymer "Staphyloid (registered trademark)" AC-3355, TR-2122 (produced by Takeda Chemical Industries, Ltd.), butyl acrylate-methyl methacrylate copolymer "PARALOID (registered trademark)" EXL-2611 and EXL-3387 (produced by Rohm & Haas), "Kane Ace (registered trademark)" MX series (produced by KANEKA CORPORATION) and the like, can be used.

The block copolymer including a block whose glass transition temperature is 20° C. or lower is not particularly limited in its chemical structure, molecular weight or the like; however, the block copolymer preferably has a block compatible with an epoxy resin as well as the block whose glass transition temperature is 20° C. or lower, which is incompatible with an epoxy resin.

It is also preferred that the block copolymer including a block whose glass transition temperature is 20° C. or lower is at least one block copolymer selected from the group consisting of a S-B-M type, a B-M type, and a M-B-M type (hereinafter, sometimes abbreviated as a block copolymer). Thereby, it is possible to significantly improve the interlaminar fracture toughness of the fiber-reinforced composite material while maintaining excellent heat resistance, and mechanical strength in severe usage environment such as a low-temperature environment as a fiber-reinforced composite material.

Here, the above-mentioned blocks represented by S, B and M, respectively, are covalently bonded directly to one another or bonded to one another with an intermediate molecule interposed therebetween.

The block M is a block composed of a homopolymer of methyl methacrylate or a copolymer containing methyl methacrylate in an amount of at least 50% by weight. Introduction of a monomer other than methyl methacrylate into the block M as a copolymerization component is favorably performed from the viewpoint of the compatibility with the epoxy resin and the control of various properties of the cured product. Such a monomer copolymerization component is not particularly limited and can be appropriately selected, and in order to obtain the compatibility with an epoxy resin having a high SP (solubility parameter) value, a monomer having a higher SP (solubility parameter) value than methyl methacrylate, particularly a water-soluble monomer, is suitably used. Among the water-soluble monomer, acrylamide derivatives can be suitably used, and particularly dimethylacrylamide can be suitably used. Further, reactive monomers can be applicable.

Herein, the reactive monomer means a monomer having a functional group capable of reacting with an oxirane group of an epoxy molecule or a functional group of a curing agent. Examples of the monomer include monomers having a reactive functional group such as an oxirane group, an amine group or a carboxyl group, but it is not limited to these monomers. As the reactive monomer, (meth)acrylic acid (in the present specification, methacrylic acid and acrylic acid are collectively abbreviated to "(meth)acrylic acid"), or monomers capable of being hydrolyzed to form (meth) acrylic acid can also be used. The reactive monomer is preferably used since by using it, the compatibility with the epoxy resin and adhesion at an interface between an epoxy resin and block copolymer is improved.

Examples of other monomers capable of constituting the block M include glycidyl methacrylate and tert-butyl methacrylate, and at least 60% by weight of the block M is preferably composed of syndiotactic PMMA (polymethyl methacrylate).

The block B is incompatible with the block M and is a block whose glass transition temperature Tg (hereinafter, sometimes abbreviated to only Tg) is 20° C. or lower. The glass transition temperature Tg of the block B is preferably 0° C. or lower, and more preferably −40° C. or lower. The lower the glass transition temperature Tg is, the more preferred it is from the viewpoint of the toughness; however, when it is below −100° C., a problem of processability that a machined surface is roughened in forming a fiber-reinforced composite material may arise.

The glass transition temperature Tg of the block B can be measured according to a DMA method using RSAII (Rheometric Scientific Inc.) in either case of using the epoxy resin composition or the block copolymer alone. That is, a plate-shaped sample having a size of 1 mm×2.5 mm×34 mm was measured at temperatures of −60° C. to 250° C. by a DMA method applying a traction period of 1 Hz, and a tan δ value is taken as a glass transition temperature Tg. Herein, the sample is prepared as described below. When the epoxy resin composition is used, a plate-shaped cured product free from voids is obtained by defoaming an uncured resin composition in vacuum, and then curing the resin composition at a temperature of 130° C. for 2 hours in a mold set so as to be 1 mm in thickness by a spacer with a thickness of 1 mm made of "Teflon (registered trademark)". When the block copolymer is used, a plate free from voids is similarly obtained by using a twin-screw extruder. These plates can be cut to the above-mentioned size with a diamond cutter and evaluated.

A monomer constituting the block B is preferably diene selected from among butadiene, isoprene, 2,3-dimethyl-1,3-butadiene, 1,3-pentadiene and 2-phenyl-1,3-butadiene. It is preferred from the viewpoint of toughness to select from particularly among polybutadiene, polyisoprene and random copolymers thereof, or partially or completely hydrogenated polydienes. Among polybutadienes, 1,2-polybutadiene (Tg: about 0° C.) is also exemplified; however, it is more preferred to use polybutadiene having the lowest glass transition temperature Tg, for example, 1,4-polybutadiene (Tg: about −90° C.). The reason for this is that it is advantageous from the viewpoint of the impact resistance and the toughness to use the block B having a lower glass transition temperature Tg. The block B may be hydrogenated. This hydrogenation is performed according to a common method.

Alkyl (meth)acrylate is also preferred as the monomer for constituting the block B. Specific examples thereof include ethyl acrylate (−24° C.), butyl acrylate (−54° C.), 2-ethylhexyl acrylate (−85° C.), hydroxyethyl acrylate (−15° C.), and 2-ethylhexyl methacrylate (−10° C.). Herein, a numeric value shown in a parenthesis following a name of each of the respective acrylates is a glass transition temperature Tg of the block B to be obtained in using each acrylate. Among these, butyl acrylate is preferably used. These acrylate monomers are incompatible with acrylate of the block M containing methyl methacrylate in an amount of at least 50 parts by weight.

Among these, as the block B, a block comprising a polymer selected from among 1,4-polybutadiene, polybutyl acrylate and poly(2-ethylhexyl acrylate) is preferred.

The block S is incompatible with the block B and the block M and its glass transition temperature Tg is higher than that of the block B. The Tg or a melting point of the block S is preferably 23° C. or higher, and more preferably 50° C. or higher. Examples of the block S include blocks obtained from aromatic vinyl compounds such as styrene, α-methylstyrene or vinyl toluene.

Specific examples of the triblock copolymer S-B-M, as the copolymer consisting of styrene-butadiene-methyl methacrylate, include Nanostrength 123, Nanostrength 250, Nanostrength 012, Nanostrength E20 and Nanostrength E40 respectively produced by Arkema K.K. Specific examples of the triblock copolymer M-B-M, as the copolymer consisting of methyl methacrylate-butyl acrylate-methyl methacrylate, include Nanostrength M22 produced by Arkema K.K., and Nanostrength M22N and Nanostrength SM4032XM10 respectively produced by Arkema K.K. which are formed by copolymerizing Nanostrength M22 as a base with a monomer having a high SP (solubility parameter) value. Among these copolymers, Nanostrength M22N and Nanostrength SM4032XM10 formed by copolymerization of the monomer having a high SP value are preferably used since they form a fine phase separation structure and impart high toughness.

The amount of such an elastomer [D] to be mixed is preferably 2 to 15 parts by mass, more preferably 3 to 10 parts by mass, and moreover preferably 4 to 8 parts by mass with respect to 100 parts by mass of the total amount of epoxy resins, from the viewpoint of mechanical characteristics and adaptability to a composite preparation process.

When the amount to be mixed is less than 2 parts by mass, the toughness and ability of plastic deformation of a cured product are deteriorated and the impact resistance of the resulting fiber-reinforced composite material is lowered. When the amount to be mixed is more than 15 parts by mass, the elastic modulus of a cured product is decreased, the static strength properties of the resulting fiber-reinforced composite material is deteriorated, and a resin flow at a molding temperature is decreased and therefore the resulting fiber-reinforced composite material tends to include voids.

The epoxy resin composition of the present invention can be mixed with a coupling agent and inorganic fillers such as thermosetting resin particles, silica gel, carbon black, clay, carbon nanotubes and metal powders within a range which does not interfere with the effect of the present invention.

In order to produce the epoxy resin composition of the present invention, it is preferred that constituents (components) other than the polyamine curing agent [C] are uniformly heated and kneaded at a temperature of about 150° C. to 170° C. at first, the resulting mixture is cooled to a temperature of about 80° C., and then the polyamine curing agent [C] is added and kneaded; however, a method of mixing the components is not particularly limited to this method.

The prepreg of the present invention is obtained by impregnating reinforcing fibers with the above-mentioned epoxy resin composition. A mass fraction of fibers in the prepreg is preferably 40 to 90% by mass, and more preferably 50 to 80% by mass. When the mass fraction of fibers is too low, a mass of the resulting composite material is excessive, and an advantage of the fiber-reinforced composite material excellent in the specific strength and the specific elastic modulus, may be impaired, and when the mass fraction of fibers is too high, defective impregnation of a resin composition occurs, and voids of the resulting composite material tends to increase and mechanical properties of the composite material may be significantly deteriorated.

When the epoxy resin composition of the present invention is used as a matrix resin of the prepreg, from the viewpoint of processing properties such as tackiness or drape, viscosity at 80° C. of the epoxy resin composition is preferably 0.1 to 200 Pa·s, more preferably 0.5 to 100 Pa·s, and moreover preferably 1 to 50 Pa·s. When the viscosity at 80° C. is 0.1 Pa·s or more, a shape of the prepreg can be held, a resin flow at the time of molding hardly occurs to cause less variation in the content of reinforcing fibers. When the viscosity at 80° C. is 200 Pa·s or less, the occurrence of a blur is suppressed in a step of forming a film of the epoxy resin composition and the epoxy resin composition is excellent in a property of impregnating the reinforcing fibers.

The viscosity referred to herein refers to a complex viscosity $\eta^*$ which is measured in conditions of a temperature raising rate 2° C./min, a frequency 0.5 Hz, and a gap 1 mm by use of a parallel plate of 40 mm in diameter using a dynamic viscoelasticity measuring device, for example, ARES (manufactured by TA Instruments Co.).

The mode of reinforcing fibers is not particularly limited, and for example, long fibers paralleled in one direction, tows, woven fabrics, mats, knits, braids and the like are used. Furthermore, particularly for an application requiring a high specific strength and a high specific elastic modulus, reinforcing fibers arranged in parallel in one direction are most suitable; however, an arrangement of woven fabric easy to handle is also suitable for the present invention.

Examples of the reinforcing fibers include glass fibers, carbon fibers, graphite fibers, aramid fibers, boron fibers, alumina fibers, silicon carbide fibers and the like. Two or more kinds of these reinforcing fibers may be mixed for use; however, in order to obtain lighter and more durable formed product, it is preferred to use carbon fibers or graphite fibers. Particularly, in applications highly requiring reduction of weight and increase of strength of materials, carbon fibers are suitably used because of their excellent specific elastic modulus and excellent specific strength.

As the carbon fibers, all types of carbon fibers can be used in accordance with applications; however, it is preferred to be carbon fibers having a tensile modulus of at most 400 GPa from the viewpoint of the impact resistance. Further, from the viewpoint of strength, carbon fibers preferably having tensile strength of 4.4 to 6.5 GPa are used since it can provide a composite material having high rigidity and mechanical strength. Further, the tensile elongation is also an important element, and it is preferred that the carbon fibers are high-strength and high-elongation carbon fibers having the tensile elongation of 1.7% to 2.3%. Accordingly, carbon fibers having characteristics of a tensile modulus of at least 230 GPa, tensile strength of at least 4.4 GPa and tensile elongation of at least 1.7% are most suitable.

Examples of commercially available products of the carbon fibers include "Torayca (registered trademark)" T800G-24K, "Torayca (registered trademark)" T800S-24K, "Torayca (registered trademark)" T700G-24K, "Torayca (registered trademark)" T300-3K and "Torayca (registered trademark)" T700S-12K (all produced by Toray Industries, Inc.).

The mode or arrangement of carbon fibers can be appropriately selected from among long fibers paralleled in one direction, woven fabrics and the like; however, it is preferred that the carbon fibers are in the mode of continuous fibers such as long fibers paralleled in one direction (fiber bundle), woven fabrics or the like in order to obtain a lightweight carbon fiber-reinforced composite material with durability at a higher level.

Examples of a method for producing a prepreg include a method (wet method) of dissolving the aforementioned epoxy resin composition used as the matrix resin in a solvent such as methyl ethyl ketone or methanol to lower the viscosity of the composition, and impregnating reinforcing fibers with the dissolved epoxy resin composition, and a hot melt method (dry method) of lowering the viscosity of the matrix resin by heating, and impregnating reinforcing fibers with the matrix resin.

The wet method is a method of immersing reinforcing fibers into a solution of the epoxy resin composition as the matrix resin, subsequently pulling up the reinforcing fibers, and evaporating the solvent using an oven, etc. The hot melt method (dry method) is a method of impregnating reinforcing fibers directly with an epoxy resin composition whose viscosity is lowered by heating, or a method of once coating releasing paper or the like with an epoxy resin composition to prepare a film, overlaying the aforementioned film on both sides or one side of reinforcing fibers, and heating and pressurizing to impregnate the reinforcing fibers with the resin. The hot melt method is preferred since the solvent remaining in the prepreg becomes virtually nil.

The fiber-reinforced composite material of the present invention contains reinforcing fibers and a cured product obtained by curing the epoxy resin composition of the present invention.

The fiber-reinforced composite material is prepared by a method of laminating sheets of the prepreg thus obtained, and heating and curing the matrix resin while applying a pressure to the laminate, and the like. In this case, as the method of applying heat and pressure, a press molding method, an autoclave molding method, a backing molding method, a wrapping tape method, an internal pressure molding method and the like can be employed.

The fiber-reinforced composite material can also be prepared by a method of impregnating reinforcing fibers directly with an epoxy resin composition without using a prepreg, and subsequently heating and curing, for example, a molding method such as a hand lay-up method, a filament winding method, a pultrusion method, a resin injection molding method, or a resin transfer molding method, etc. In these methods, it is preferred to prepare an epoxy resin composition by mixing two components of a main component composed of an epoxy resin and an epoxy resin curing agent immediately before use.

The fiber-reinforced composite material formed by using the epoxy resin composition of the present invention as a matrix resin is suitably used for sports applications, aircraft applications and general industrial applications. More specifically, the fiber-reinforced composite material can be suitably used for aerospace applications including aircraft primary structural materials such as main wings, tail surfaces and floor beams, secondary structural materials such as flaps, ailerons, cowlings, fairings and interior materials, rocket motor cases, structural materials of artificial satellites, and the like. Of such aerospace applications, the fiber-reinforced composite materials are particularly suitably used in aircraft primary structural material applications, especially fuselage skin and main wing skin, because of the high impact resistance requirements and stringent requirements for low-temperature tensile strength due to the exposure to low temperatures during high-altitude flights. Further, the fiber-reinforced composite material can be suitably used for sports applications including golf shafts, fishing rods, tennis, badminton or squash rackets, hockey sticks, and ski poles. Moreover, it can be suitably used for general industrial applications including structural materials of moving bodies such as automobiles, marine vessels and rail vehicles, drive shafts, plate springs, blades of wind mills, pressure vessels, fly wheels, papermaking rollers, and civil engineering and architectural material applications including roof materials, cables, reinforcing bars and repairing and reinforcing materials.

EXAMPLES

Hereinafter, the epoxy resin composition of the present invention will be described more specifically by way of Examples. Preparation methods and evaluation methods of resin raw materials used in examples will be described below.

<Epoxy Resin>
<Epoxy Resin [A] Having Structure Represented by Formula (1)>

(Production Method of A-1: Used Patent Document 4 as a Reference)

Into a 300 mL separable flask equiped with a three-way cock, 45.1 parts by weight (0.1 mole) of 9,9-bis(6-hydroxy-2-naphthyl)fluorene (synthesized according to Example 1 in JP2007-99741A) and 92.0 parts by weight (1.0 mole) of epichlorohydrin (produced by KANTO CHEMICAL CO., INC.) were charged, and a temperature of the resulting mixture was raised to 50° C. to dissolve the mixture, and then the inside of a reaction container was replaced with nitrogen. Then, 10.0 parts by weight (0.25 mole) of flaked sodium hydroxide was added to the inside of the reaction container in 4 parts every 20 minutes so as to maintain a temperature of a reaction mixture of around 60° C. and the resulting mixture was further stirred for about 7 hours to be reacted.

Disappearance of a raw material was confirmed using HPLC. After completion of the reaction, epichlorohydrin remaining in a system was eliminated at 60° C. under a pressure of 100 torr, 110 g of methyl isobutyl ketone was charged and the resulting mixture was maintained at 60° C. Thereafter, a reactant was filtrated under a reduced pressure to remove a salt produced during a reaction. Subsequently, 66.0 parts by weight (0.495 mole) of a 30% aqueous solution of sodium hydroxide was added dropwise while maintaining at 80° C., and after all sodium hydroxide aqueous solution was added dropwise, the resulting mixture was stirred for about 1 hour, and 55 parts by weight of pure water was further added. Moreover, an organic layer was washed with 55 parts by weight of pure water five times, subsequently passed through a filter paper having 15 parts by weight of anhydrous magnesium sulfate (produced by KANTO CHEMICAL CO., INC.) laid thereon to be dried, and dried at 90° C. for 15 hours under a pressure of 10 torr, and consequently 33.58 parts by weight of a white powder (yield 62.8%). The obtained white powder was analyzed by HPLC and GPC, and consequently it was verified that the powder was a white powder having a purity of 85% or more and containing 9,9-bis(6-glycidyloxy-2-naphthyl)fluorene as an objective substance.

<Bisphenol Type Epoxy Resin [Bx]>
"jER (registered trademark)" 806 (liquid bisphenol F type epoxy resin, produced by Mitsubishi Chemical Corp.)
"jER (registered trademark)" 828 (liquid bisphenol A type epoxy resin, produced by Mitsubishi Chemical Corp.)
"jER (registered trademark)" 1001 (solid bisphenol A type epoxy resin, produced by Mitsubishi Chemical Corp.)
<Amine Type Epoxy Resin [By]>
ELM434 (tetraglycidyldiaminodiphenyl methane, produced by Sumitomo Chemical Co., Ltd.)
"jER (registered trademark)" 630 (amine type epoxy resin, produced by Mitsubishi Chemical Corp.)
"Araldite (registered trademark)" MY0600 (triglycidylaminophenol, produced by HUNTSMAN ADVANCED MATERIALS)
GAN (diglycidylaniline, produced by Nippon Kayaku Co., Ltd.)
<Epoxy Resin Other Than [A], [Bx] and [By]>
"jER (registered trademark)" 152 (phenol novolak type epoxy resin, produced by Mitsubishi Chemical Corp.)
"EPICLON (registered trademark)" HP7200L (dicyclopentadiene type epoxy resin, produced by DIC Corporation).
"Oncoat (registered trademark)" EX-1010 (fluorene type epoxy resin, produced by Nagase ChemteX Corporation)
"DENACOL (registered trademark)" EX-721 (phthalate ester type epoxy resin, produced by Nagase ChemteX Corporation)
"jER (registered trademark)" YX8000 (hydrogenated bisphenol A type epoxy resin, produced by Mitsubishi Chemical Corp.).
<Polyamine Curing Agent [C]>
3,3'-DAS (3,3'-diaminodiphenylsulfone, produced by Mitsui Fine Chemicals, Inc.)
DICY7 (dicyandiamide, produced by Mitsubishi Chemical Corp.)
<Curing Agent Other Than [C]>
H-4 (phenol novolak resin, produced by Meiwa Plastic Industries, Ltd.)

<Thermoplastic Resin [Bz]>
"SUMIKAEXCEL (registered trademark)" PES5003P (polyethersulfone, produced by Sumitomo Chemical Co., Ltd.)
"TORAYPEARL (registered trademark)" TN (polyamide particles, produced by Toray Industries, Inc., average particle diameter: 13.0 μm)
<Elastomer [D]>
"Nanostrength" M22N (a M-B-M type block copolymer in which B consists of butyl acrylate (Tg: −54° C.) and M consists of a random copolymerization chain of methyl methacrylate and a polar acrylic monomer, produced by Arkema K.K.)
"Kane Ace (registered trademark)" MX-416 (core-shell rubber particles made of styrene-butadiene-methyl methacrylate, average particle diameter: 100 nm, produced by KANEKA CORPORATION). A master batch in concentration of 40 parts by mass, based on tetraglycidyldiaminodiphenyl methane. In compositional tables of Examples and Comparative Examples in Tables 1 to 3, the number of parts as the rubber particles is shown, and tetraglycidyldiaminodiphenyl methane contained in the master batch is included in ELM434 shown.
<Other Components>
TPP (triphenylphosphine, curing accelerator, produced by K.I Chemical Industry Co., Ltd.)
DCMU99 (3-(3,4-dichlorophenyl)-1,1-dimethylurea, curing accelerator, produced by Hodogaya Chemical Co., Ltd.)

(1) Preparation of Epoxy Resin Composition

The epoxy resin, and the thermoplastic resin [Bz] and the elastomer [D] as required were added in predetermined amounts in a kneader, a temperature of the resulting mixture was raised to 160° C. while kneading the mixture, and the mixture was kneaded at 160° C. for 1 hour to obtain a transparent viscous liquid. The mixture was cooled to 80° C. while being kneaded, and a predetermined amount of the polyamine curing agent [C] was added and further kneaded to prepare an epoxy resin composition.

(2) Measurement of Bending Elastic Modulus and Bending Strength of Resin Cured Product The epoxy resin composition prepared in the above paragraph (1) was defoamed in vacuum, and then injected into a mold set so as to be 2 mm in thickness by a spacer with a thickness of 2 mm made of "Teflon (registered trademark)". The epoxy resin composition was cured at 180° C. for 2 hours to prepare a resin cured product with a thick of 2 mm. Then, a specimen of 10 mm wide and 60 mm long was cut out of the obtained plate of a resin cured product, and subjected to a three-point bend test at a bending span of 32 mm, and the bending modulus and the bending strength were determined according to JIS K 7171-1994. The bending elastic modulus in a state of being wet and hot was determined by measuring a bending elastic modulus of a plate of a resin cured product which was obtained by the above-mentioned method and immersed in boiled water for 48 hours.

(3) Toughness ($K_{IC}$) Measurement of Resin Cured Product

The epoxy resin composition prepared in the above (1) was defoamed in vacuum, and then cured at a temperature of 180° C. for 2 hours in a mold set so as to be 6 mm in thickness by a spacer with a thickness of 6 mm made of "Teflon (registered trademark)" to obtain a resin cured product with a thickness of 6 mm. The resin cured product was cut to a size of 12.7×150 mm to obtain a specimen. Using an Instron universal testing machine (manufactured by Instron Japan Co., Ltd.), the specimen was machined and its toughness ($K_{IC}$) was measured according to ASTM D5045 (1999). An initial introduction of precrack into the specimen was performed by applying a razor edge cooled to a liquid nitrogen temperature to the specimen and making an impact on the razor with a hammer. The toughness of a resin cured product referred to herein refers to a critical stress intensity factor of a deformation mode (aperture type).

(4) Measurement of Glass Transition Temperature

From the plate of a resin cured product prepared in the above (2), 7 mg of a resin cured product was taken out, and measurement was performed at a temperature raising rate of 10° C./min in a temperature range of 30° C. to 350° C. using model No. DSC2910 manufactured by TA Instruments Co., and a middle point temperature determined according to JIS K 7121: 1987 was taken as a glass transition temperature Tg to evaluate heat resistance of a resin cured product. The glass transition temperature in absorbing moisture was determined by measuring a glass transition temperature of a plate of a resin cured product which was obtained by the above-mentioned method and immersed in boiled water for 48 hours.

(5) Water Absorption Measurement of Resin Cured Product

A water absorption of the resin cured product was determined from a weight difference between the specimen obtained by heating/drying the plate of a resin cured product prepared in the above (2) at 80° C. for 20 hours and the specimen absorbing water by immersing the dried plate of a cured resin cured in boiled water for 48 hours.

(6) Viscosity Measurement of Epoxy Resin Composition

As the viscosity of the epoxy resin composition is employed a value at 80° C. of a complex viscosity ($\eta^*$) measured in conditions in which a parallel plate of 40 mm in diameter was used, a temperature was simply increased at a temperature raising rate of 2° C./min, a frequency was 0.5 Hz and a Gap was 1 mm using a dynamic viscoelasticity measuring device, for example, ARES (manufactured by TA Instruments Co.).

Example 1

In a kneading apparatus, 70 parts by mass of A-1 (the epoxy resin [A] having the structure represented by the formula (1)), 20 parts by mass of "jER (registered trademark)" 806 (bisphenol type epoxy resin [Bx]), and 10 parts by mass of "jER (registered trademark)" 152 (epoxy resin other than [A], [Bx] and [By]) were kneaded, and then 20 parts by mass of 3,3'-DAS serving as the polyamine curing agent [C] was kneaded to prepare an epoxy resin composition. The composition of the epoxy resin composition and mixing ratio of components are shown in Table 1 (numerals in Table 1 represent part(s) by mass). Properties of the obtained epoxy resin compositions were measured according to the above-mentioned method. The results of measurement are shown in Table 1.

Examples 2 to 20, Comparative Examples 1 to 6

Epoxy resin compositions were prepared in the same manner as in Example 1 except for changing the epoxy resin, the thermoplastic resin, the elastomer, other components, the curing agent and the amounts to be mixed as shown in Tables 1 to 3. Properties of the resulting epoxy resin compositions were measured as described above. The results are shown in Tables 1 to 3.

TABLE 1

| | | Example 1 | Example 2 | Example 3 | Example 4 | Exampl 5 |
|---|---|---|---|---|---|---|
| Epoxy Rresin Having Structure Represented by Formula (1) [A] | A-1 | 70 | 50 | 50 | 30 | 20 |
| Bisphenol Type Epoxy Resin [Bx] | "jER ®" 806 | 20 | | 40 | 50 | 80 |
| | "jER ®" 828 | | 40 | | | |
| | "jER ®" 1001 | | | | | |
| Amine Type Epoxy Resin [By] | ELM434 | | | | 10 | 20 |
| | "jER ®" 630 | | | | | |
| | "Araldite ®" MY0600 | | | | | |
| | GAN | | | 10 | | |
| Epoxy Resin Other Than [A], [Bx] and [By] | "jER ®" 152 | 10 | | | | |
| | "EPICLON ®" HP7200L | | | | | |
| | "Oncoat ®" EX-1010 | | | | | |
| | "DENACOL ®" EX-721 | | | | | |
| | "jER ®" YX8000 | | | | | |
| Thermoplastic Resin [Bz] | "SUMIKAEXCEL ®" PES5003P | | | 2 | 15 | 15 |
| | "TORAYPEARL ®" TN | | | | | 15 |
| Elastomer Component [D] | Block Copolymer "Nanostrength" M22N | | | | | |
| | Core-Shell Rubber Particles "Kane Ace ®" MX-416 | | | | | |
| Other Components | TPP | | | | | |
| | DCMU99 | | | | | |
| Curing Agent [C] | 3,3'-DAS | 20 | 25 | 25 | 30 | 30 |
| | DICY7 | | | | | |
| Curing Agent Other Than [C] | H-4 | | | | | |
| Resin Cured Product Properties | Bending Elastic Modulus (GPa) | 4.2 | 4.2 | 4.4 | 4.2 | 4.0 |
| | HTW Bending Elastic Modulus (GPa) | 4.0 | 4.0 | 4.2 | 4.0 | 3.8 |
| | Bending Strength (MPa) | 169 | 171 | 187 | 174 | 154 |
| | $K_{IC}$ (MPam0.5) | 0.7 | 0.7 | 1.0 | 1.1 | 1.4 |
| | Glass Transition Temperature (° C.) | 192 | 177 | 178 | 174 | 155 |
| | Glass Transition Temperature in Wet and Hot State (° C.) | 164 | 146 | 158 | 141 | 123 |
| | Water Absorption (%) | 2.0 | 2.1 | 2.1 | 2.3 | 2.2 |
| | Complex Viscosity at 80° C. (Pas) | 98 | 41 | 49 | 34 | 20 |

| | | Example 6 | Example 7 | Example 8 | Example 9 | Example 10 |
|---|---|---|---|---|---|---|
| Epoxy Rresin Having Structure Represented by Formula (1) [A] | A-1 | 10 | 30 | 25 | 40 | 60 |
| Bisphenol Type Epoxy Resin [Bx] | "jER ®" 806 | 20 | 60 | | | 20 |
| | "jER ®" 828 | | | 35 | | |
| | "jER ®" 1001 | 20 | | | | |
| Amine Type Epoxy Resin [By] | ELM434 | 50 | 10 | 20 | | |
| | "jER ®" 630 | | | | 30 | |
| | "Araldite ®" MY0600 | | | | | |
| | GAN | | | 20 | 30 | 20 |
| Epoxy Resin Other Than [A], [Bx] and [By] | "jER ®" 152 | | | | | |
| | "EPICLON ®" HP7200L | | | | | |
| | "Oncoat ®" EX-1010 | | | | | |
| | "DENACOL ®" EX-721 | | | | | |
| | "jER ®" YX8000 | | | | | |
| Thermoplastic Resin [Bz] | "SUMIKAEXCEL ®" PES5003P | | | | | |
| | "TORAYPEARL ®" TN | | | | | |
| Elastomer Component [D] | Block Copolymer "Nanostrength" M22N | 2 | 7 | | | |
| | Core-Shell Rubber Particles "Kane Ace ®" MX-416 | | | 15 | | |
| Other Components | TPP | | | | | |
| | DCMU99 | | 2 | | | |
| Curing Agent [C] | 3,3'-DAS | 30 | | 30 | 35 | 25 |
| | DICY7 | | 5 | | | |
| Curing Agent Other Than [C] | H-4 | | | | | |
| Resin Cured Product Properties | Bending Elastic Modulus (GPa) | 4.2 | 4.2 | 4.0 | 4.6 | 4.6 |
| | HTW Bending Elastic Modulus (GPa) | 3.9 | 3.7 | 3.8 | 4.4 | 4.4 |
| | Bending Strength (MPa) | 179 | 172 | 174 | 182 | 177 |
| | $K_{IC}$ (MPam0.5) | 1.2 | 1.5 | 1.2 | 0.6 | 0.6 |
| | Glass Transition Temperature (° C.) | 169 | 164 | 170 | 177 | 170 |
| | Glass Transition Temperature in Wet and Hot State (° C.) | 132 | 114 | 134 | 141 | 138 |
| | Water Absorption (%) | 2.5 | 3.8 | 2.4 | 2.4 | 2.2 |
| | Complex Viscosity at 80° C. (Pas) | 23 | 45 | 82 | 28 | 89 |

TABLE 2

|  |  | Example 11 | Example 12 | Example 13 | Example 14 | Example 15 |
|---|---|---|---|---|---|---|
| Epoxy Rresin Having Structure Represented by Formula (1) [A] | A-1 | 50 | 5 | 40 | 20 | 10 |
| Bisphenol Type Epoxy Resin [Bx] | "jER ®" 806 | 40 | 50 | 40 |  | 40 |
|  | "jER ®" 828 |  |  |  | 40 |  |
|  | "jER ®" 1001 |  |  |  |  |  |
| Amine Type Epoxy Resin [By] | ELM434 |  | 45 |  |  | 50 |
|  | "jER ®" 630 | 10 |  | 20 |  |  |
|  | "Araldite ®" MY0600 |  |  |  | 40 |  |
|  | GAN |  |  |  |  |  |
| Epoxy Resin Other Than [A], [Bx] and [By] | "jER ®" 152 |  |  |  |  |  |
|  | "EPICLON ®" HP7200L |  |  |  |  |  |
|  | "Oncoat ®" EX-1010 |  |  |  |  |  |
|  | "DENACOL ®" EX-721 |  |  |  |  |  |
|  | "jER ®" YX8000 |  |  |  |  |  |
| Thermoplastic Resin [Bz] | "SUMIKAEXCEL ®" PES5003P |  |  | 2 | 15 | 15 |
|  | "TORAYPEARL ®" TN |  |  |  |  | 15 |
| Elastomer Component [D] | Block Copolymer "Nanostrength" M22N |  |  |  |  |  |
|  | Core-Shell Rubber Particles "Kane Ace ®" MX-416 |  |  |  |  |  |
| Other Components | TPP |  |  |  |  |  |
|  | DCMU99 |  |  |  |  |  |
| Curing Agent [C] | 3,3'-DAS | 25 | 35 | 30 | 30 | 35 |
|  | DICY7 |  |  |  |  |  |
| Curing Agent Other Than [C] | H-4 |  |  |  |  |  |
| Resin Cured Product Properties | Bending Elastic Modulus (GPa) | 4.4 | 4.2 | 4.5 | 4.3 | 4.2 |
|  | HTW Bending Elastic Modulus (GPa) | 4.2 | 3.9 | 4.3 | 4.0 | 3.8 |
|  | Bending Strength (MPa) | 186 | 185 | 194 | 190 | 187 |
|  | $K_{IC}$ (MPam0.5) | 0.8 | 0.8 | 0.9 | 0.9 | 1.2 |
|  | Glass Transition Temperature (° C.) | 176 | 173 | 174 | 182 | 175 |
|  | Glass Transition Temperature in Wet and Hot State (° C.) | 146 | 132 | 141 | 142 | 130 |
|  | Water Absorption (%) | 2.1 | 2.9 | 2.3 | 2.8 | 3.2 |
|  | Complex Viscosity at 80° C. (Pas) | 35 | 15 | 44 | 22 | 23 |

|  |  | Example 16 | Example 17 | Example 18 | Example 19 | Example 20 |
|---|---|---|---|---|---|---|
| Epoxy Rresin Having Structure Represented by Formula (1) [A] | A-1 | 30 | 30 | 30 | 30 | 40 |
| Bisphenol Type Epoxy Resin [Bx] | "jER ®" 806 | 20 | 40 | 40 |  |  |
|  | "jER ®" 828 |  |  |  |  |  |
|  | "jER ®" 1001 |  |  |  |  |  |
| Amine Type Epoxy Resin [By] | ELM434 | 50 |  |  | 30 |  |
|  | "jER ®" 630 |  |  |  |  |  |
|  | "Araldite ®" MY0600 |  |  | 30 |  |  |
|  | GAN |  |  |  |  |  |
| Epoxy Resin Other Than [A], [Bx] and [By] | "jER ®" 152 |  |  |  |  | 40 |
|  | "EPICLON ®" HP7200L |  |  |  |  | 20 |
|  | "Oncoat ®" EX-1010 |  |  |  |  |  |
|  | "DENACOL ®" EX-721 |  |  |  | 50 |  |
|  | "jER ®" YX8000 |  |  |  | 20 |  |
| Thermoplastic Resin [Bz] | "SUMIKAEXCEL ®" PES5003P |  |  |  | 20 | 15 |
|  | "TORAYPEARL ®" TN |  |  |  |  |  |
| Elastomer Component [D] | Block Copolymer "Nanostrength" M22N | 2 | 7 |  |  |  |
|  | Core-Shell Rubber Particles "Kane Ace ®" MX-416 |  |  | 15 |  |  |
| Other Components | TPP |  |  |  |  |  |
|  | DCMU99 | 2 |  |  |  |  |
| Curing Agent [C] | 3,3'-DAS |  | 30 | 30 | 30 | 25 |
|  | DICY7 | 5 |  |  |  |  |
| Curing Agent Other Than [C] | H-4 |  |  |  |  |  |
| Resin Cured Product Properties | Bending Elastic Modulus (GPa) | 4.5 | 4.5 | 4.3 | 4.4 | 4.3 |
|  | HTW Bending Elastic Modulus (GPa) | 3.9 | 4.2 | 4.0 | 3.9 | 4.1 |
|  | Bending Strength (MPa) | 176 | 205 | 189 | 179 | 175 |
|  | $K_{IC}$ (MPam0.5) | 0.9 | 1.2 | 1.1 | 0.1 | 1.0 |
|  | Glass Transition Temperature (° C.) | 180 | 181 | 183 | 153 | 190 |
|  | Glass Transition Temperature in Wet and Hot State (° C.) | 128 | 141 | 142 | 113 | 159 |
|  | Water Absorption (%) | 3.9 | 2.6 | 2.8 | 2.9 | 2.1 |
|  | Complex Viscosity at 80° C. (Pas) | 88 | 197 | 49 | 18 | 63 |

TABLE 3

|  |  | Comparative Example 1 | Comparative Example 2 | Comparative Example 3 | Comparative Example 4 |
|---|---|---|---|---|---|
| Epoxy Rresin Having Structure Represented by Formula (1) [A] | A-1 | 100 | | | |
| Bisphenol Type Epoxy Resin [Bx] | "jER ®"806 | | 50 | | |
| | "jER ®" 828 | | | | 4 |
| | "jER ®" 1001 | | | | |
| Amine Type Epoxy Resin [By] | ELM434 | | | | |
| | "jER ®" 630 | | | | 10 |
| | "Araldite ®" MY0600 | | | 20 | |
| | GAN | | | | |
| Epoxy Resin Other Than [A], [Bx] and [By] | "jER ®" 152 | | | | |
| | "EPICLON ®" HP7200L | | | | |
| | "Oncoat ®" EX-1010 | | 50 | | 50 |
| | "DENACOL ®" EX-721 | | | 80 | |
| | "jER ®" YX8000 | | | | |
| Thermoplastic Resin [Bz] | "SUMIKAEXCEL ®" PES5003P | | | | |
| | "TORAYPEARL ®" TN | | | | |
| Elastomer Component [D] | Block Copolymer "Nanostrength" M22N | | 3 | | |
| | Core-Shell Rubber Particles "Kane Ace ®" MX-416 | | | | |
| Other Components | TPP | | | | |
| | DCMU99 | | | | |
| Curing Agent [C] | 3,3'-DAS | | 25 | 45 | 25 |
| | DICY7 | | | | |
| Curing Agent Other Than [C] | H-4 | 1 | | | |
| Resin Cured Product Properties | Bending Elastic Modulus (GPa) | 3.5 | 3.4 | 4.2 | 3.9 |
| | HTW Bending Elastic Modulus (GPa) | 3.4 | 3.1 | 3.5 | 3.5 |
| | Bending Strength (MPa) | 123 | 145 | 153 | 148 |
| | $K_{IC}$ (MPam0.5) | 0.4 | 1.5 | 0.6 | 0.6 |
| | Glass Transition Temperature (° C.) | 231 | 149 | 152 | 175 |
| | Glass Transiton Temperature in Wet and Hot State (° C.) | 211 | 114 | 101 | 132 |
| | Water Absorption (%) | 1.6 | 3.1 | 3.8 | 3.2 |
| | Complex Viscosity at 80° C. (Pas) | — | 36 | 0.9 | 31 |

|  |  | Comparative Example 5 | Comparative Example 6 | Comparative Example 7 |
|---|---|---|---|---|
| Epoxy Rresin Having Structure Represented by Formula (1) [A] | A-1 | | | |
| Bisphenol Type Epoxy Resin [Bx] | "jER ®"806 | | | 40 |
| | "jER ®" 828 | 30 | 20 | |
| | "jER ®" 1001 | 50 | | |
| Amine Type Epoxy Resin [By] | ELM434 | | 30 | 30 |
| | "jER ®" 630 | | | |
| | "Araldite ®" MY0600 | | | |
| | GAN | 10 | | |
| Epoxy Resin Other Than [A], [Bx] and [By] | "jER ®" 152 | | | 30 |
| | "EPICLON ®" HP7200L | 10 | | |
| | "Oncoat ®" EX-1010 | | 50 | |
| | "DENACOL ®" EX-721 | | | |
| | "jER ®" YX8000 | | | |
| Thermoplastic Resin [Bz] | "SUMIKAEXCEL ®" PES5003P | | | |
| | "TORAYPEARL ®" TN | | | |
| Elastomer Component [D] | Block Copolymer "Nanostrength" M22N | | | |
| | Core-Shell Rubber Particles "Kane Ace ®" MX-416 | | 5 | |
| Other Components | TPP | | | |
| | DCMU99 | 3 | | |
| Curing Agent [C] | 3,3'-DAS | | 25 | 35 |
| | DICY7 | 5 | | |
| Curing Agent Other Than [C] | H-4 | | | |
| Resin Cured Product Properties | Bending Elastic Modulus (GPa) | 3.1 | 3.8 | 3.8 |
| | HTW Bending Elastic Modulus (GPa) | 2.7 | 3.4 | 3.4 |
| | Bending Strength (MPa) | 141 | 154 | 163 |
| | $K_{IC}$ (MPam0.5) | 1.5 | 1.2 | 0.6 |
| | Glass Transition Temperature (° C.) | 119 | 185 | 168 |
| | Glass Transiton Temperature in Wet and Hot State (° C.) | 74 | 139 | 123 |
| | Water Absorption (%) | 3.2 | 3.3 | 3.2 |
| | Complex Viscosity at 80° C. (Pas) | 8 | 37 | 25 |

It is found from the comparison between Examples 1 to 20 and Comparative Example 1 that adequate toughness is not achieved when any of the constituents [Bx], [By] and [Bz] is not mixed even though the constituent [A] is mixed. In addition, the epoxy resin composition of Comparative Example 1 is too high in viscosity and caused voids in the resin cured product.

It is found from the comparison between Examples 1 to 20 and Comparative Example 2 that the elastic modulus and heat resistance are remarkably deteriorated when the constituent [A] is not mixed even though the constituent [Bx] is mixed.

It is found from the comparison between Examples 1 to 20 and Comparative Example 3 that the toughness is remarkably deteriorated and adequate moisture resistance is not achieved when the constituent [A] is not mixed even though the constituent [By] is mixed.

It is found from the comparison between Examples 1 to 20 and Comparative Examples 4 to 7 that the balance between characteristics of the resin cured product is deteriorated, and the bending strength or moist-heat resistance is also inadequate when the constituent [A] is not mixed even though any one of the constituents [Bx], [By] and [Bz] is mixed.

INDUSTRIAL APPLICABILITY

According to the present invention, it is possible to provide an epoxy resin composition which provides a cured product having excellent heat resistance, toughness and elastic modulus. The fiber-reinforced composite material obtained from such an epoxy resin composition is particularly suitably used for structural materials because of its excellent compression strength and interlaminar fracture toughness. For example, the fiber-reinforced composite material can be suitably used for aerospace applications including aircraft primary structural materials such as main wings, tail surfaces and floor beams, secondary structural materials such as flaps, ailerons, cowlings, fairings and interior materials, rocket motor cases, structural materials of artificial satellites, and the like. Further, it can be suitably used for general industrial applications including structural materials of moving bodies such as automobiles, marine vessels and rail vehicles, drive shafts, plate springs, blades of wind mills, various turbines, pressure vessels, fly wheels, papermaking rollers, and civil engineering and architectural material applications including roof materials, cables, reinforcing bars and repairing and reinforcing materials. Moreover, the fiber-reinforced composite material can be suitably used for sports applications including golf shafts, fishing rods, tennis, badminton or squash rackets, hockey sticks, and ski poles.

The invention claimed is:
1. An epoxy resin composition comprising:
20 to 40 parts by mass of [A] an epoxy resin having a structure represented by formula (1)

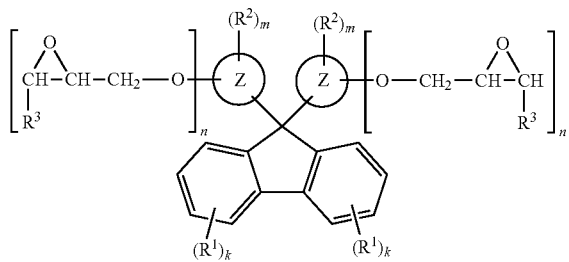

(1)

in which each ring Z represents a condensed polycyclic aromatic hydrocarbon ring selected from a naphthalene ring and an anthracene ring, $R^1$ and $R^2$ represent a substituent, $R^3$ represents a hydrogen atom or a methyl group, k is an integer of 0 to 4, m is an integer of 0 to 6 for a naphthalene ring and 0 to 8 for an anthracene ring, n is an integer of 1 to 7 for a naphthalene ring and 1 to 9 for an anthracene ring, and m+n is an integer of 1 to 7 for a naphthalene ring and 1 to 9 for an anthracene ring;

20 to 50 parts by mass of [Bx] a bisphenol type epoxy resin;

10 to 50 parts by mass of [By] an amine type epoxy resin; and

[C] a polyamine curing agent;

wherein [A], [Bx], and [By] are present in a combined amount of 100 parts by mass.

2. The epoxy resin composition according to claim 1, further comprising 2 to 30 parts by mass of [Bz] a thermoplastic resin.

3. The epoxy resin composition according to claim 1, further comprising 2 to 15 parts by mass of [D] an elastomer.

4. The epoxy resin composition according to claim 1, wherein its complex viscosity at 80° C. is 0.1 to 200 Pa·s.

5. The epoxy resin composition according to claim 1, wherein in formula (1) k is 0 and m is an integer of 0 to 1, and $R^2$ represents a substituent selected from the group consisting of hydrocarbon, alkoxy, cycloalkoxy, aryloxy, aralkyloxy, acyl, halogen, nitro, cyano and substituted amino groups.

6. The epoxy resin composition according to claim 5, wherein the amine type epoxy resin [By] is selected from tetraglycidyldiaminodiphenyl methane, tetraglycidyldiaminodiphenyl sulfone, triglycidylaminophenol, triglycidylaminocresol, diglycidylaniline, diglycidyltoluidine, tetraglycidylxylylenediamine, a halogen-substituted product thereof, an alkyl-substituted product thereof, and a hydrogenated product thereof.

7. The epoxy resin composition according to claim 1, wherein the amine type epoxy resin [By] is selected from tetraglycidyldiaminodiphenyl methane, tetraglycidyldiaminodiphenyl sulfone, triglycidylaminophenol, triglycidylaminocresol, diglycidylaniline, diglycidyltoluidine, tetraglycidylxylylenediamine, a halogen-substituted product thereof, an alkyl-substituted product thereof, and a hydrogenated product thereof.

8. A prepreg formed by impregnating reinforcing fibers with the epoxy resin composition according to claim 1.

9. The prepreg according to claim 8, wherein the reinforcing fibers are carbon fibers.

10. A fiber-reinforced composite material containing reinforcing fibers and a cured product of an epoxy resin composition, wherein the epoxy resin composition is the epoxy resin composition according to claim 1.

* * * * *